US007212818B2

(12) United States Patent
Haumont

(10) Patent No.: US 7,212,818 B2
(45) Date of Patent: May 1, 2007

(54) METHOD, DEVICE AND SYSTEM FOR ADJUSTING MOBILITY MANAGEMENT

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/501,581

(22) PCT Filed: Jan. 22, 2002

(86) PCT No.: PCT/EP02/00598

§ 371 (c)(1),
(2), (4) Date: Jul. 14, 2004

(87) PCT Pub. No.: WO03/063535

PCT Pub. Date: Jul. 31, 2003

(65) Prior Publication Data

US 2005/0119008 A1  Jun. 2, 2005

(51) Int. Cl.
 *H04Q 7/20* (2006.01)
(52) U.S. Cl. .................. 455/435.1; 455/434; 455/437; 455/421; 455/574
(58) Field of Classification Search ............ 455/456.1, 455/456.2, 456.3, 440, 441, 435.1, 574, 421, 455/434, 437
See application file for complete search history.

(56) References Cited

U.S. PATENT DOCUMENTS

| 6,078,826 | A  | * | 6/2000 | Croft et al. ................ 455/574 |
| 6,275,695 | B1 | * | 8/2001 | Obhan ....................... 455/423 |
| 6,393,285 | B1 | * | 5/2002 | Stephens ................. 455/435.1 |
| 6,584,331 | B2 | * | 6/2003 | Ranta ........................ 455/574 |
| 2004/0030601 | A1 | * | 2/2004 | Pond et al. .................. 705/16 |

FOREIGN PATENT DOCUMENTS

| WO | WO 99/52306  | 10/1999 |
| WO | WO 99/052306 | * 10/1999 |
| WO | WO 00/38469  | 6/2000 |

OTHER PUBLICATIONS

"3rd Generation Partnership Project; Technical Specification Group Core Network; Mobile radio interface layer 3 specification; Core Network Protocols—Stage 3 (Release 1999)" 3GPP TS 24.008 V3.9.0 (2001-09); pp. 1-442.
"3rd Generation Partnership Project; Technical Specification Group Services and System Aspects; General Packet Radio Service (GPRS); Service description; Stage 2 (Release 1999)" 3GPP TS 23.060 V3.9.0 (2001-10); pp. 1-189.
D. Plassmann, "Location Management Strategies for Mobile Cellular Networks of 3rd Generation", Vehicular Technology Conference, 1994 IEEE 44th Stockholm, Sweden, Jun. 8-10, 1994, pp. 649-653, XP010123353.

* cited by examiner

*Primary Examiner*—Lester G. Kincaid
*Assistant Examiner*—Dung Lam
(74) *Attorney, Agent, or Firm*—Squire, Sanders & Dempsey L.L.P.

(57) ABSTRACT

It is disclosed a method of adjusting mobility management in a mobile communication network, said mobile communication network comprising a mobility control unit (4; 40; 320) adapted to track location of communication units (1; 10; 310) communicating in said mobile communication network and to control the mobility management for said communication units. Mobility information related to a communication unit is provided (S1) to said mobility control unit, which evaluates (S2) the degree of mobility of said communication unit from said mobility information related to said communication unit. On the basis of said evaluated degree of mobility, mobility management elements used for mobility management of said communication unit in said mobile communication network are correspondingly adjusted (S3). Furthermore, there are disclosed a corresponding mobility control unit, a corresponding communication unit as well as a corresponding mobility management adjustment system.

53 Claims, 7 Drawing Sheets

METHOD, DEVICE AND SYSTEM FOR ADJUSTING MOBILITY MANAGEMENT

FIELD OF THE INVENTION

The present invention relates to a method for adjusting mobility management (MM) settings in a mobile communication network, e.g. a cellular mobile communication network, and in particular to a method for optimizing the MM settings for a machine to machine (M2M) application in a mobile communication network. The present invention is also related to a corresponding mobility control unit, a communication unit and/or a corresponding system.

BACKGROUND OF THE INVENTION

In the last years mobile communication became more and more popular. New developments in this field of telecommunication open up an ever increasing number of new application areas.

One of these new application areas is a M2M application. M2M stands for machine-to-machine, mobile-to-machine and/or machine-to-mobile communication. The purpose is to enable controlling procedures, monitoring procedures, parameter setting procedures, transaction procedures and the like with machines such as vending machines, elevators, pumps and meters and the like via a mobile communication system. In other words, communication connections between systems, devices and individuals are to be established. This can be done, for example, via the Internet with which mobile communication networks can already establish connections and perform data transmission. As wireless access methods can be used, for example, CSD (Circuit Switched Data), HSCSD (High Speed Circuit Switched Data), GPRS (General Packet Radio Service), USSD (Unstructured Supplementary Services Data) and SMS (Short Message Service), which are all commonly known to a person skilled in the art and for which a detailed description is omitted. M2M applications can be employed in different types of carrier devices which are placed on mobile or static platforms, for example static vending machines or mobile devices in cars, or the like.

When a wireless connection for a communication unit of the M2M application is used, as for example a mobile communication connection, the M2M communication unit is treated like any other common mobile station (mobile phone). This means that all procedures to be executed in order to establish a connection between the M2M communication unit and the mobile communication network are done as usual, such as call control, mobility management (abbreviated hereinafter as MM), and the like.

Commonly agreed standards for MM, e.g. in a GPRS environment, are disclosed, for example in 3GPP (3rd Generation Partnership Project) specifications TS 24.008 V3.9.0 (2001-09) and TS 23.060 V3.9.0 (2001-10). In these specifications, among others, in particular MM processing and the adjustments of MM timers (ready timer, periodic routing area (RA) update timer, mobile reachable timer) in mobile stations and network control nodes such as SGSN (serving GPRS support node) are described as they are usually to be performed. The terms standby state, ready state, ready timer, periodic location area update, periodic RA update, location area (LA) update, periodic RA update timer, cell update, mobile reachable timer, which are commonly known by a person skilled in the art, are for example defined in these referred 3GPP specifications TS 24.008 V3.9.0 (2001-09) and TS 23.060 V3.9.0 (2001-10). A particular example of MM procedure is how long is an mobile station maintained in ready mode (2G GPRS) and how often a periodic update (e.g. periodic Routing Area (RA) update in GPRS) is performed.

Currently MM timers are optimized based on average behavior of a Mobile station (MS), i.e. MS mobility (affecting e.g. number of RA update; number of cell updates; probability to move out of coverage) and MS traffic pattern (affecting e.g. probability to be paged). In addition, MM timers takes into account various other factors such as a RA size (affecting e.g. number of RA update and paging load) and quality of coverage (affecting e.g. probability to move out of coverage).

For better understanding, a short description of present mobility management in different mobile communication systems, e.g. in a mobile switching center (MSC), second generation serving GPRS support node (2G SGSN), 3G SGSN, and relevant differences thereof is given. These, however, are known to persons skilled in the art.

A 2G SGSN tracks the location of an MS at a cell level in ready mode, and in RA level in stand-by mode. The MS and network stay in ready mode for the duration of the ready timer after the last uplink transmission. After that both change to stand-by mode where RA Update are made when RA change or periodic RA Update timer expires. In order to prevent fast moving MS to, stay always in ready mode (as they always make cell update before ready timer expiry), the SGSN may force the MS to move to stand-by after a routing area update procedure. The ready timer and periodic RAU timer values are indicated to the MS in the attach accept or RA Update accept message.

A 3G SGSN tracks the location of an MS at radio network controller (RNC) level in MM-Connected mode, and in RA level in MM-IDLE mode. RNC tracks the user at cell or URA (UTRAN (UMTS Terrestrial Radio Access Network) Registration Area) level. The RNC has a mobility management (sometimes referred as location management) mechanism very similar to the MM mechanism described above as it also has periodic cell or URA update procedure. The periodic timer (value) applicable is broadcasted in the area. The MS and network stay in MM-Connected mode until this one is explicitly released. A corresponding release request may be initiated from the RNC (e.g. triggered by an inactivity timer or triggered by detecting the maximum number of URA update without data transmission) or from the SGSN (e.g. by moving back the MS to MM-Idle state after completion of a RA update procedure). In the MM-Idle mode, RA updates are made when the RA changes or when the periodic RA update timer expires.

The ready timer and periodic RA update timer values are indicated to the MS in the attach accept or RA update accept message for both 2G and 3G. It is to be noted that this ready timer value is sent also in 3G protocols (due to the desired interoperability with 2G) although 3G does not comprise a ready state.

An MSC (2G or 3G) tracks the location of an MS at RNC or base station controller (BSC) level in MM-Connected mode (i.e. during a call), and in LA level in MM-IDLE mode. The MS and network stay in MM-Connected mode until this one is explicitly released. The release request may be initiated from the RNC (e.g. due to a loss of coverage during the call) or from the MSC (e.g. due to an end of the call). In MM-Idle mode, location updates are made when the LA changes or a periodic Location Update timer expires. The periodic Location Update timer value is currently indicated to the MS in the broadcast information (thus, all MS in same location area use the same value).

However, when a large number of additional communication units for M2M applications are introduced in the existing mobile communication network structures this will result in an increase in the signaling load for the networks.

In document WO 00 38469 A an apparatus and a method for providing page messages to mobile radios based on the mobility rates of the mobile radio are described. For mobile radios that are relatively stationary, page messages are sent to a cell in which the mobile radio resides, while radios which are increasingly mobile receive their page messages on a local area basis. The mobile radio only performs location updates when the situation is optimized for doing so depending upon the mobility of the radio, the introduction of a new cell, the introduction of a new location area, the expiration of a pre-determined time limit and the status of a new cell location flag. A function is defined for location updating on either a locationary basis or a cell basis in accordance with each of the above factors in order to optimize the burden of location area updating and unwanted page broadcasting.

In document WO 99 52306 A a method in the packet switched data transmission between a wireless communication device and a packet network is described, in which data transmission between the wireless communication device and the packet network is controlled with at least one packet switching controller (SGSN). A group of connection states is defined in the method, from said connection states one is selected at a given time, and the selected connection state is set to the wireless communication device and to the packet switching controller. In addition, said connection states are defined in the method to be: a ready state, in which packets are transmissable in an activated data transmission connection, a standby state, in which data transmission connection packets to be transmitted and received are waited for, and an idle state, in which the data transmission connection is deactivated. As a connection state also an extended ready state is defined, to which a transition from the ready state is conducted, and in which data transmission connection packets to be transmitted or received are waited for.

In "Location management strategies for mobile cellular networks of $3^{rd}$ generation" by D. Plassmann, Vehicular Techn. Conf., 1994, IEEE $44^{th}$ Stockholm, Sweden, 8.10 June 1994, New York, N.Y., USA, IEEE, 8 Jun. 1994, pages 649–653, XP010123353 ISBN: 0-7803-1927-3, several location management strategies applicable in cellular networks are described. Analytical modelling approaches for signalling cost minimisation are discussed. Results of a GSM based case study are given which are applicable to cellular radio systems of the $3^{rd}$ generation like MBS and UMTS. A hybrid dynamic strategy is proposed for a public MBS.

SUMMARY OF THE INVENTION

It is an object of the present invention to provide an improved method of adjusting the mobility management in a mobile communication network, and to provide a corresponding system and/or units which improve the mobility management adjustment in the mobile communication network.

This object is achieved, for example, by a method of adjusting mobility management according to claim 1.

Furthermore, this object is achieved, for example, by a mobility control unit according to claim 15.

Additionally, this object is achieved, for example, by a communication unit according to claim 29.

Furthermore this object is achieved, for example, by a mobility management adjustment system according to claim 34.

Advantageous further developments of the present invention are as set out in the respective dependent claims.

The mobility information related to said communication unit may include a specific information element indicating a periodic update timer value and/or predefined mobility management parameter for mobility management elements of said communication unit and/or said mobility control unit, said periodic update timer value and/or predefined mobility management parameter being detected in said evaluating step.

Furthermore, said mobility information related to said communication unit may include previous location information and current location information of said communication unit, said previous location information and current location information being compared in said evaluating step to determine whether they are equal.

In the adjustment, said timer elements (or mobility management elements) of said communication unit and/or said mobility control unit may be set to predefined changed periodic update timer values and/or predefined changed mobility management parameters.

Furthermore a function of the mobile communication network, which is used to force a modification of an operation state of the communication unit, may be disabled during the MM adjustment.

The communication unit may be employed in a static device used for a M2M application, such as a vending machine. This means that the communication unit represents an "immobile mobile station".

The mobility control unit may be integrated in a core network control unit of the mobile communication network. The present invention can be employed in different types of mobile communication networks, such as circuit switched or packet switched networks, $2^{nd}$ or $3^{rd}$ Generation communication networks (GSM, UMTS) and the like. Thus, the core network control unit may be, for example, a mobile switching center (MSC) or a SGSN. However, also other network control elements controlling the MM can be employed.

The timer elements (or mobility management elements) may be timer elements of said communication unit and said mobility control unit, e.g. ready timers, periodic routing area update (RAU) timers or periodic LU timer of said communication unit and/or said mobility control unit (e.g. core network control unit).

The mobility information related to said communication unit may be provided from said communication unit. Furthermore, the mobility information related to said communication unit may be provided from a core network control unit of the mobile communication network.

The mobility information may include a request for setting at least one timer element (or mobility management element) to a maximum value or a request for deactivating at least one mobility management element. Correspondingly, the timer elements (or mobility management elements) may be set to maximum setable values and/or may be deactivated. Alternatively, the timer elements (or mobility management elements) may be set to values which are incremented by a predetermined amount in comparison to the values set before.

By using the present invention it is possible to optimize mobile communication system settings with regard to parameters like location accuracy level, timer threshold values and the like used for MM. In other words, it is possible to advantageously decrease signaling load with regard to the MM processing in mobile communication networks in comparison to the generic MM processing. In particular in cases in which a M2M communication unit is, for example, a static device, it is possible to reduce MM signaling significantly by means of adjusting, for example, the ready timer and the periodic routing area update timer of the communication unit as well as the ready timer in the core network control unit to predefined changed values, e.g. to maximum values. The adjustment is preferably initiated by a mobility control unit, e.g. integrated in a core network control unit, which is adapted to identify a mobility information related to the M2M communication unit to be controlled. If this specific mobility information element is identified, the improved MM adjustment processing is executed after which periodic updates are made as rarely as possible, and e.g. in a 2G GPRS system, the communication unit is maintained in the ready state for a long time. When the M2M communication unit maintained in the ready mode is a static device, no increase of signaling load by cell update requests will result. However, a signaling load due to paging (when the communication unit is to be reached) is significantly reduced. Since the communication unit is held in the ready state for a long time, the need for paging is reduced. Furthermore, since also e.g. the periodic routing area update timer is set to the maximum value and the long duration of the ready timer delays periodic RA update requests, also the signaling load due to periodic RA update is reduced.

Preferred embodiments of the invention are described herein below in detail by way of example with reference to the accompanying drawings.

DESCRIPTION OF PREFERRED EMBODIMENTS

Figure 1:
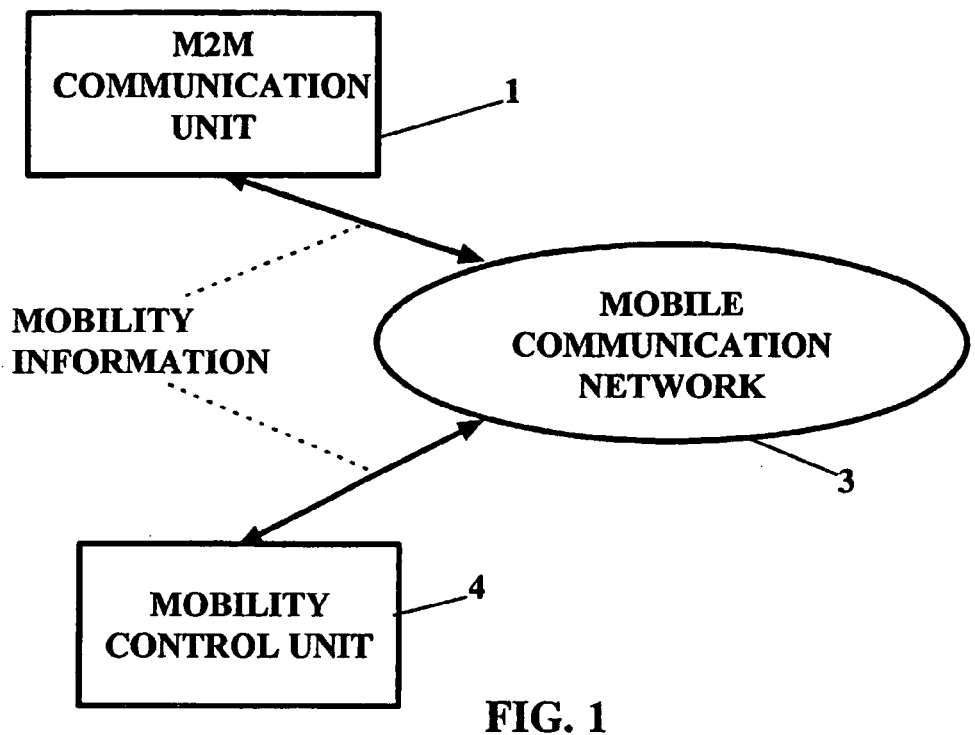
FIG. 1 shows a part of a mobile communication network for illustrating a MM adjustment procedure.
Figure 2:
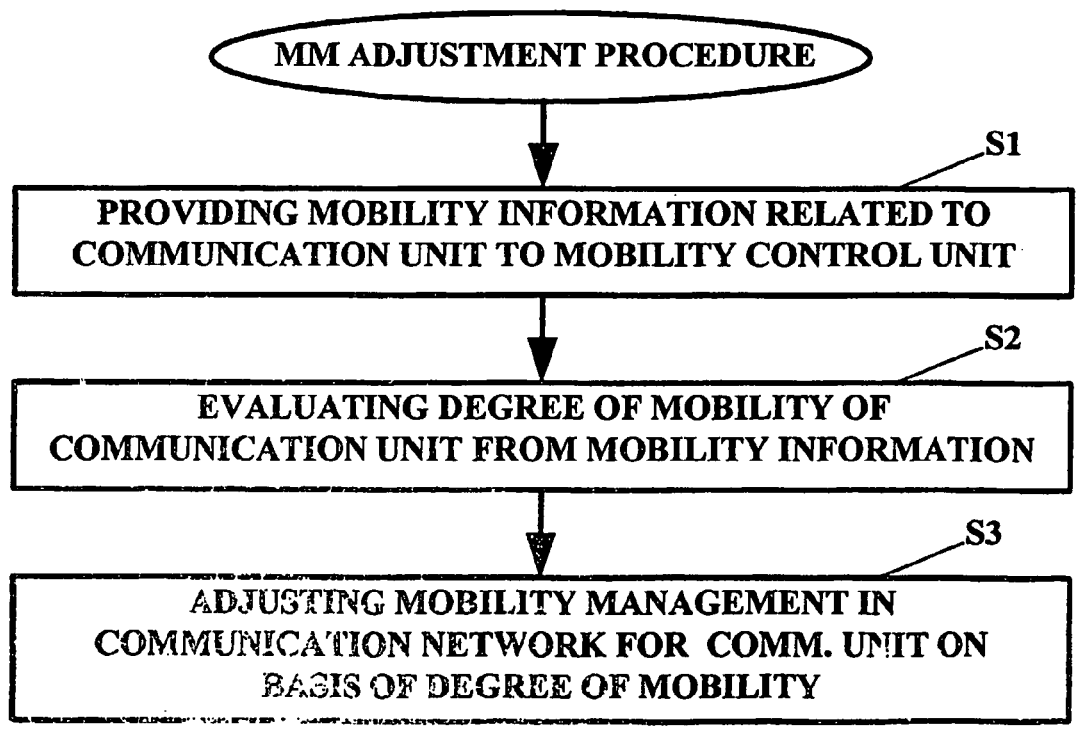
FIG. 2 is a flow chart illustrating a MM adjustment procedure.

Referring to FIGS. 1 and 2, the concept of the MM adjustment is described. According to FIG. 1, a M2M communication unit 1 is (wireless) connected with a mobile communication system 3. Via this wireless connection, signaling and traffic data communications are sent and received by the M2M communication unit. The control of this communications is placed in respective network elements (not shown) of the mobile communication network 3, as commonly known. Furthermore, a mobility control unit 4 is provided which is used to execute the MM adjustment. For this purpose, mobility information is received by the mobility control unit 4 (step S1 in FIG. 2). This mobility information are evaluated in the mobility control unit 4 in order to detect a degree of mobility of the respective M2M communication unit 1 (step S2 in FIG. 2). On the basis of this evaluated degree of mobility, the mobility control unit 4 is adapted to initiate an adjustment of the MM processing in the communication network for the M2M communication unit 1 (step S3 in FIG. 2). This will also be described later.

The mobility control unit 4 can be located at different places in the mobile communication network. It may be integrated, for example, in a core network control unit executing the MM processing, e.g. in a 2G SGSN, 3G SGSN, MSC and the like (i.e. the respective core network element is also the mobility control unit). However, it may be also implemented in a network element outside the core network structure, for example at a RNC of a 3G mobile communication network.

The mobility information may comprise different contents. For example, specific values for mobility management timers (ready timer, periodic RA update timers and the like), an explicit parameter used as an indication of mobility for the M2M communication unit, information concerning the historical behavior of M2M communication unit (no movement within the coverage area of the cellular mobile communication unit, or the like) can be used by the mobility control unit for the evaluation of the degree of mobility.

The mobility information can be sent from respective different sources in the mobile communication network. One source can be, for example, the M2M communication unit 1 itself, preferably in cases of mobility information contents like a specific value for mobility management timers or an explicit parameter used as an indication of mobility. However, it is also possible that the source for the mobility information is another network element, for example a core network element as a SGSN, for example in a case of mobility information contents like the historical behavior of M2M communication unit. Nevertheless, such historical behavior information contents can be provided also by the M2M communication unit 1.

The adjustment of the MM by the mobility control in the mobile communication network may comprise a change of setting of mobility management elements of the communication unit 1 and/or of the mobility control unit 4 (e.g. of a SGSN or the like). The mobility management elements are, for example, timers (ready timer, periodic RA update timer) whose values are changed. It is also possible to increment these values step by step. This means, the mobility management elements (timers) are set to predefined changed values which are for example stored in the mobility control unit.

Further embodiments and modifications thereof of the MM adjustment are described hereinafter for different applications. For the sake of simplicity only parts of the overall mobile communication networks are shown in order to show up the measures to reach the improved MM processing. However, as commonly known, mobile communication networks may comprise several other, elements.

Figure 3:
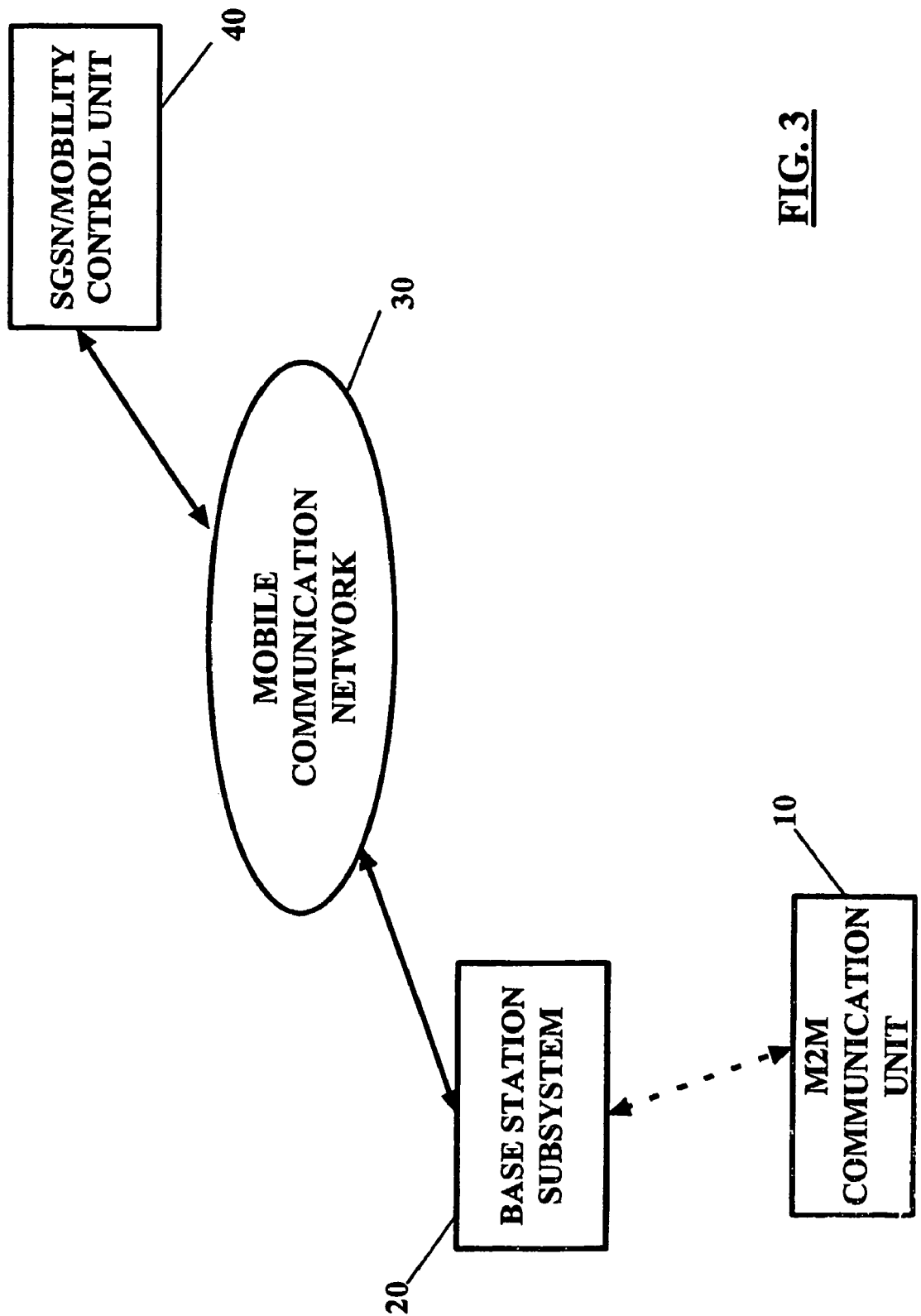
FIG. 3 shows a part of a mobile communication network for illustrating a MM adjustment procedure.

FIG. 3 shows a block diagram of a mobile communication network 30 in which the improved MM processing is implemented. According to FIG. 3, a $2^{nd}$ generation GPRS communication network is described. However, it is easy to understand that also other mobile communication networks can be used ($3^{rd}$ generation, CSD, and the like).

In FIG. 3, reference sign 10 denotes M2M communication units. A M2M communication unit 10 represents preferably a static device such as a vending machine or the like. The M2M communication unit 10 is adapted to communicate with the mobile communication network, for example via a packet switched GPRS communication connection, in order to exchange data (control and/or traffic data).

Reference sign 20 denotes a base station subsystem of the mobile communication network. The base station subsystem 20 is connected with the communication units 10, for example, via air interfaces (shown by dotted lines). The base station subsystem 20 is adapted to establish a connection between the communication units 10 and the remaining mobile communication network elements by forwarding signaling and traffic data through corresponding channels or connections to and from the communication units 10.

Reference sign 40 denotes a SGSN as a core network control unit. The core network control unit is adapted to control the elements of the mobile communication network and to perform control procedures for communication connections in the mobile communication network. In particular, the core network control unit is adapted to execute the call control (MSC) or Session Management (SGSN) and MM procedures for the communication units 10 connected to the mobile communication network 30. This means that the core network control unit 40 determines parameters used for the MM such as timer values and initiates the settings or the adjustment thereof. Moreover, the core network control unit is adapted to establish connections to other networks, e.g. via gateways (not shown), and to other communication units connected to the mobile communication network, e.g. via base station subsystems. According to this embodiment, the SGSN 40 is provided with a mobility control unit adapted to execute a MM adjustment.

Figure 4:
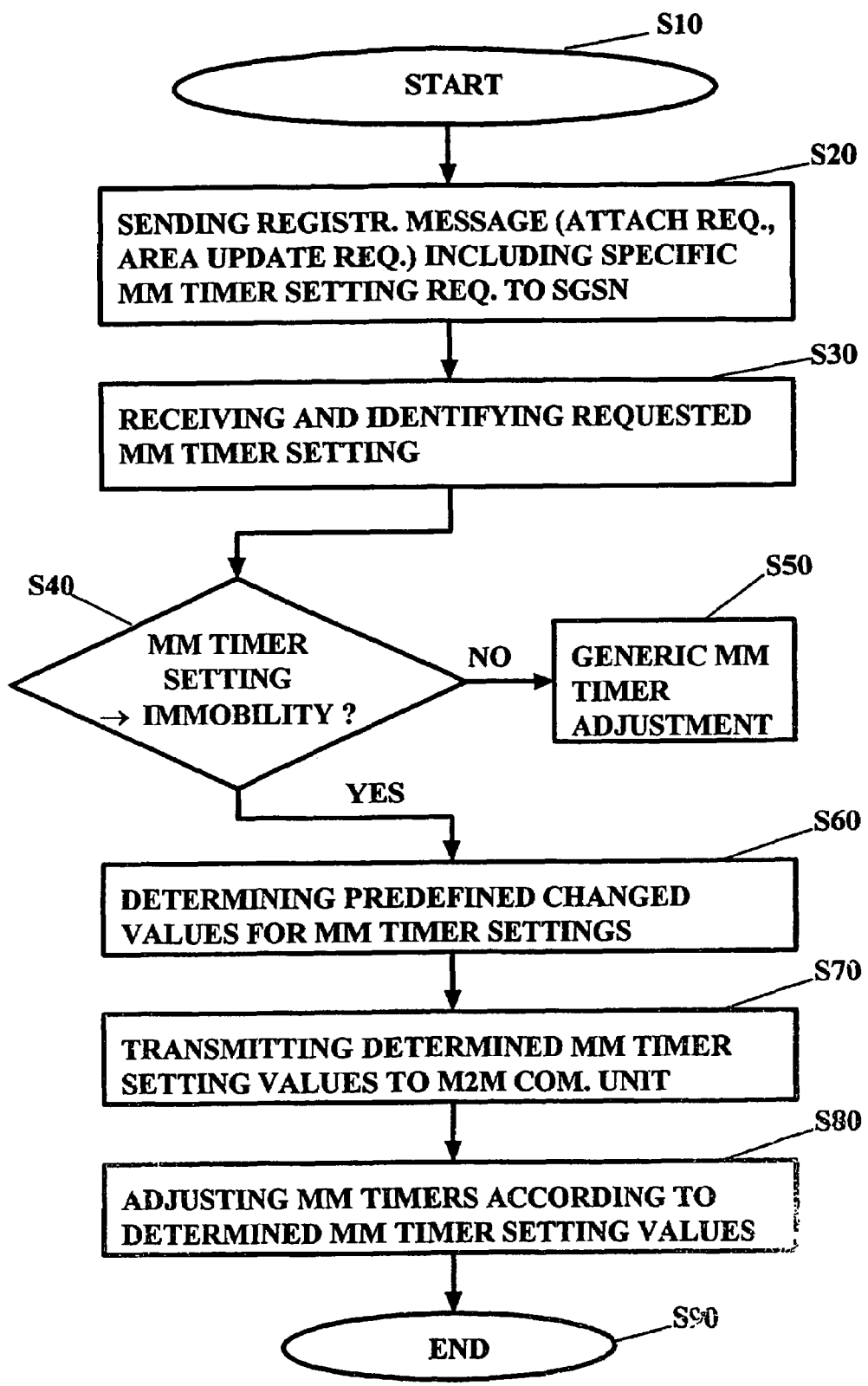
FIG. 4 is a flow chart illustrating a MM adjustment procedure.

As shown in FIG. 4, MM timers are connected with the M2M communication unit 10 and the SGSN 40. Ready timers 15, 45 define the time period in which the M2M communication unit remains in the ready state. A periodic RA update timer 16 is used to control a procedure in the M2M communication unit 10 to periodically notify the availability of the M2M communication unit 10 to the mobile communication network. This means, the periodic RA update timer 16 is used to detect when an MS lose coverage. A mobile reachable timer 46 is used to monitor the periodic RA update procedure in the SGSN.

Figure 5:
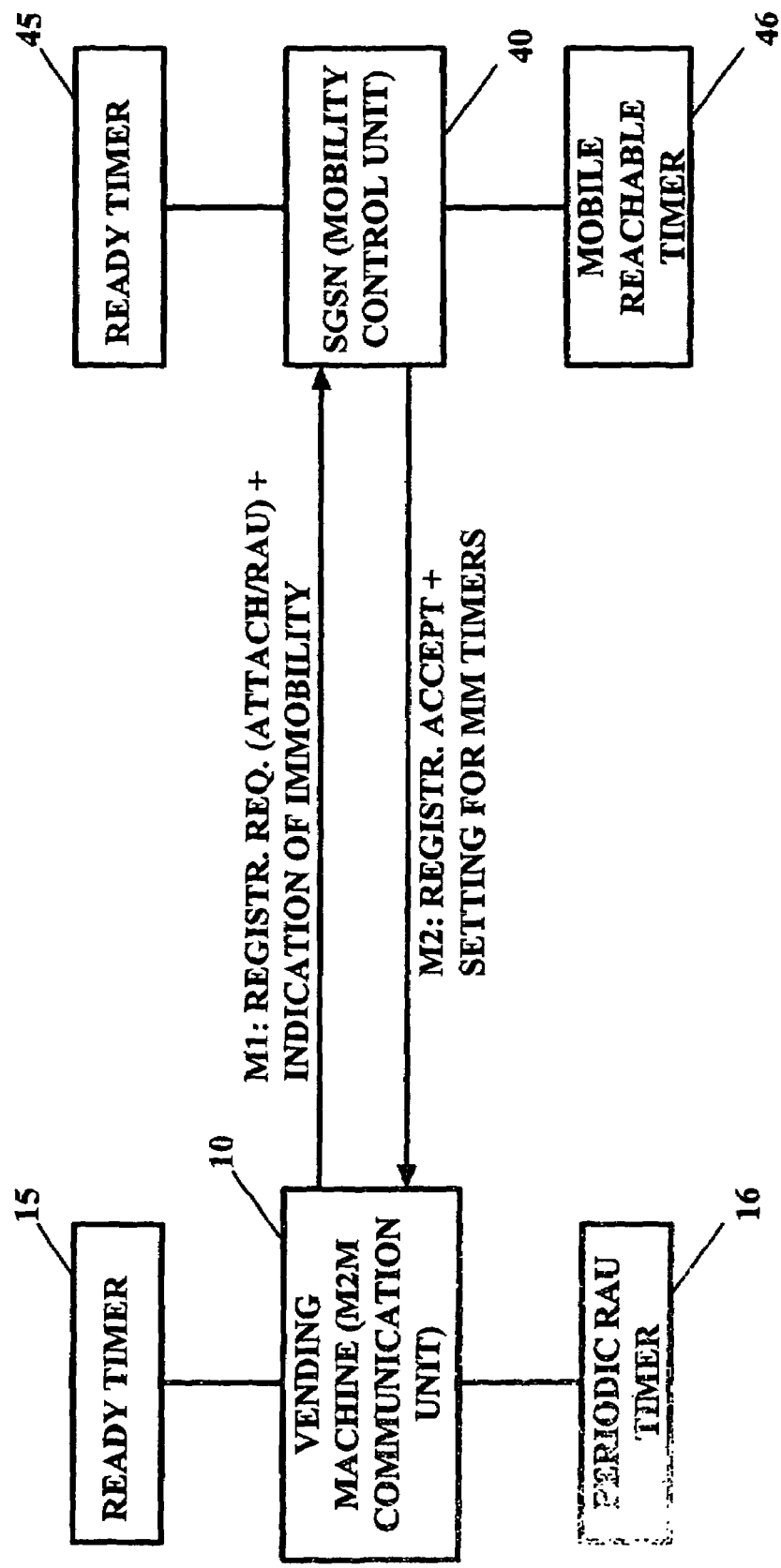
FIG. 5 is a diagram illustrating a signaling connection in the mobile communication network of FIG. 3.

With reference to FIGS. 4 and 5, the improved MM procedure being performed in the MM adjustment in the mobile communication network described above is illustrated.

In the MM adjustment procedure according to the embodiment, first, the M2M communication unit 10, for example a vending machine, sends a registration message via the base station system 20 to a SGSN 40 representing the core network control unit of the mobile communication network 30 (step S20 in FIG. 4; message M1 in FIG. 5). Usable registration messages are, for example, an attach request or a RA update request from said M2M communication unit 10. Said registration message M1 further comprises a specific mobility information element adapted to indicate the degree of mobility (or immobility) of the requesting M2M communication unit 10. In other words, said specific mobility information is used to indicate the core network, at least implicitly, that the M2M communication unit is likely not to move within the area of the mobile communication network. Hence, it indicates that, e.g., a RA update procedure will probably not occur. According to a first example, said specific information element is a request to set MM timer(s) (e.g. ready timer 15, 45, and periodic RA update timer 16) to a specific value, namely to the maximum setable value. It is proposed to use for 2G and 3G GPRS, the requested READY timer value. In the case of presently used mobile communication networks this value may be a little time over three hours.

The SGSN 40 receives the registration request M1 comprising the specific mobility information and identifies the specific mobility information as an indication of the degree of mobility of the requesting M2M communication unit 10 (step S30 in FIG. 5). For this purpose, the SGSN 40 may comprise a specific device (not shown), e.g. a software component, which is adapted to perform the identification and to initiate the improved MM processing. This is preferably performed in the mobility control unit, e.g. by using a pre-stored value for a comparison, or the like.

In the identification process (step S40 in FIG. 4), the SGSN 40 determines whether the specific mobility information comprises an acceptable value indicating the immobility of the M2M communication unit 10, e.g. the request for the maximum value of the MM timers. If this acceptable value is not recognized, i.e. when no indication of immobility can be recognized, a generic MM processing with normal timer adjustment may be performed (step S50 in FIG. 4). It is to be noted that interoperability is maintained with node not implementing this identification process, as they will always use normal timer adjustment.

Otherwise, when the SGSN 40 determines in step S40 that the specific information element comprises an acceptable value, i.e. it identifies the immobility of the requesting M2M communication unit 10, another MM processing will be performed. In this case, predefined changed values for the MM timers will be determined (step S60 in FIG. 4) by the SGSN 40, for example by means of the mobility control unit, on the basis of the specific information element. For example, the specific mobility information itself may be used as the value for the MM timer setting when the specific information element comprises the maximum value for the MM timers (e.g. the maximum value of the ready timers 15, 45). Also a table or the like stored in the SGSN 40 can be used in which the values for the MM timers related to the specific mobility information are stored. Additionally, also values for MM timers other than the ready timers 15, 45, e.g. the periodic RA update timer 16, are determined to become maximum values (in case of recently used mobile communication units, the maximum value for periodic RA update timer may be some time over three hours).

When the ready timers 15, 45 and the periodic RA update timer 16 are to be adjusted to the maximum values, according to the predefined changed values determined in step S60, the SGSN 40 adjust the ready timer 45 connected with the SGSN 40 to the determined maximum value. Furthermore, the SGSN 40 transmits the determined MM timer setting values to the requesting M2M communication unit 10 in connection with an acceptance message M2 (FIG. 5) for the registration request M1 (step S70 in FIG. 4), i.e. an attach accept message or a RA update accept message. The determined MM timer setting values in the message M2 comprises the maximum values for the ready timer 15 and the periodic RA update timer 16. These maximum values are used by the M2M communication unit 10 to adjust the MM timers in the M2M communication unit 10 such that the maximum time period is achieved for both MM timers (step S80 in FIG. 4). In parallel, the SGSN 40 has adjusted its MM timer(s) (i.e. the ready timer 45 and its mobile reachable timer 46) to the maximum value, wherein in practice a small time delay is to be considered due to the transmission time required so as to ensure that both ready timers 15, 45 match. Thereafter, the MM processing is ended (step S90 in FIG. 4).

Preferably, the SGSN 40 is controlled in such way that a "Forced to standby" procedure, which is usually performed in the generic MM processing to force a mobile station to enter from the ready mode into a standby mode, is not performed in answering periodic RA update from such a M2M communication unit 10. For this purpose, for example, an indication that the M2M communication unit 10 is immobile is stored in a memory (not shown) to which the SGSN 40 refers to when a "Forced to standby" processing is to be executed. This storing may be performed for example in connection with step S70. When this indication for the respective M2M communication unit can be found in said memory, the "Forced to standby" processing will be disabled.

Preferred values for the setting of the ready timer and the periodic RA update timer are presently, for example, a little bit over 3 hours, respectively. Thus, the overall time (i.e. time of ready timer+time of periodic RA update timer) is somewhat over 6 hours. Hence, routing area update is performed as rarely as possible, which is to be preferred as the M2M communication unit is not moving. Hence, MM signaling load can be reduced by the improved MM adjustment in comparison to generic MM procedure. For example, in comparison to the generic MM in which for a communication unit (also for a static one) the ready timer is set to 36 seconds and periodic RA update timer is set to 3 hours, the load generated by the static M2M communication unit adjusted with the values as described is divided by 2. For a M2M communication unit for which the ready timer is set to 36 seconds and periodic RA update timer is set to 30 minutes, the load generated is divided even by 12.

Additionally, the paging load is reduced in the mobile communication network as the communication unit 10 remains a long time in the ready state, due to the high value for the ready timer, and the SGSN 40 is aware of that fact.

Alternatively to the above described embodiment, it is also possible that the M2M communication unit 10 requests, instead a specific value for the ready timer, a value indicating a deactivation of the ready timer.

In such case there are at least two possible ways for the SGSN 40 to react. Which one of these is to be selected may depend, for example, on operator's presettings of the SGSN 40.

First possibility is that the SGSN 40 accepts this value, i.e. the deactivation of the ready timer. A corresponding setting for the MM timers will then be transmitted to the M2M communication unit 10 (equivalent to step S70 in FIG. 4) which is processed by the M2M communication unit 10 to deactivate the ready timer 16. A corresponding processing is performed by the SGSN 40 with regard to the ready timer 45.

This means, that the SGSN stores the requesting M2M communication unit to be always in the ready mode. A possible loss of coverage (e.g. by physical destruction or battery expiration) will not be detected by the cellular mobile system. However, routing RA update signaling is completely suppressed, i.e. the MM signaling load is further reduced.

The second possibility is that the SGSN does not accept this value as it would suspend mobile reachable timer 46 which is the only way to detect that an M2M communication unit is not present anymore. In this case, the SGSN 40 (or the mobility management adjustment device comprised therein) may proceed as described in the first embodiment, i.e. adjusting the MM timers to the maximum value (steps S40, S60 to S90 of FIG. 4).

It should be noted that a benefit of this previous embodiment is that this MM adjustment can be existing with the requested READY timer value which are already part of the protocol for 2G and 3G GPRS (see, e.g., 3GPP 24.008). It is to be noted that this ready timer may be sent also in 3G protocols (due to interoperability with 2G even is 3G does not have a ready state), and so this timer (value) may also be used to indicate the degree of mobility in a 3G system.

A second embodiment is that the MS (i.e. the M2M communication unit) reports its mobility to the network (i.e. to the mobility control unit) with a new explicit parameter. The following description is applicable to mobile connected to a MSC. However, the same ideas apply also to other system such as GPRS.

A first option is to indicate the mobility through an explicit mobility management parameter "mobility indication". A first simple solution is to indicate only 2 values (static or normal) for this parameter. This value is then configured in the MS and detected in the mobility control unit. A second alternative is that this parameter contain a more complex mobility value (e.g. on a scale from 1 to 10, 1 being static, and 10 fast moving). This value is derived in a standard way by the MS. For example, the MS use the number of cell changes in the last hours (up to a few days). Preferably exponential weight should be applied to give more weight to recent cell changes than to old one. And the resulting value should be mapped to the proposed scale. It should be noted that MS is always aware of cell changes as it has to select on which cell to camp. This mobility indication is included as a new optional information element in the location updating request (used also to attach to the MSC). In the location updating accept message, the MSC includes a new parameter "periodic Location Update timer value". If the MS receives this parameter, it shall use this value instead of the value broadcast on the system information. This kind of MM adjustment requires changes to specifications, but such a mechanism can be introduced without backward compatibility problems. Only MS (e.g. M2M communication units) supporting this feature may send in the request the new parameter "mobility indication", so only MS supporting this feature may receive in response the new parameter "periodic Location Update timer value". If the MS support this feature, but not the MSC, the MSC will ignore this unknown optional parameter ("mobility indication"), and so it will not return any "periodic Location Update timer value". The MS will then use the normal value as broadcast on system information.

Figure 6:
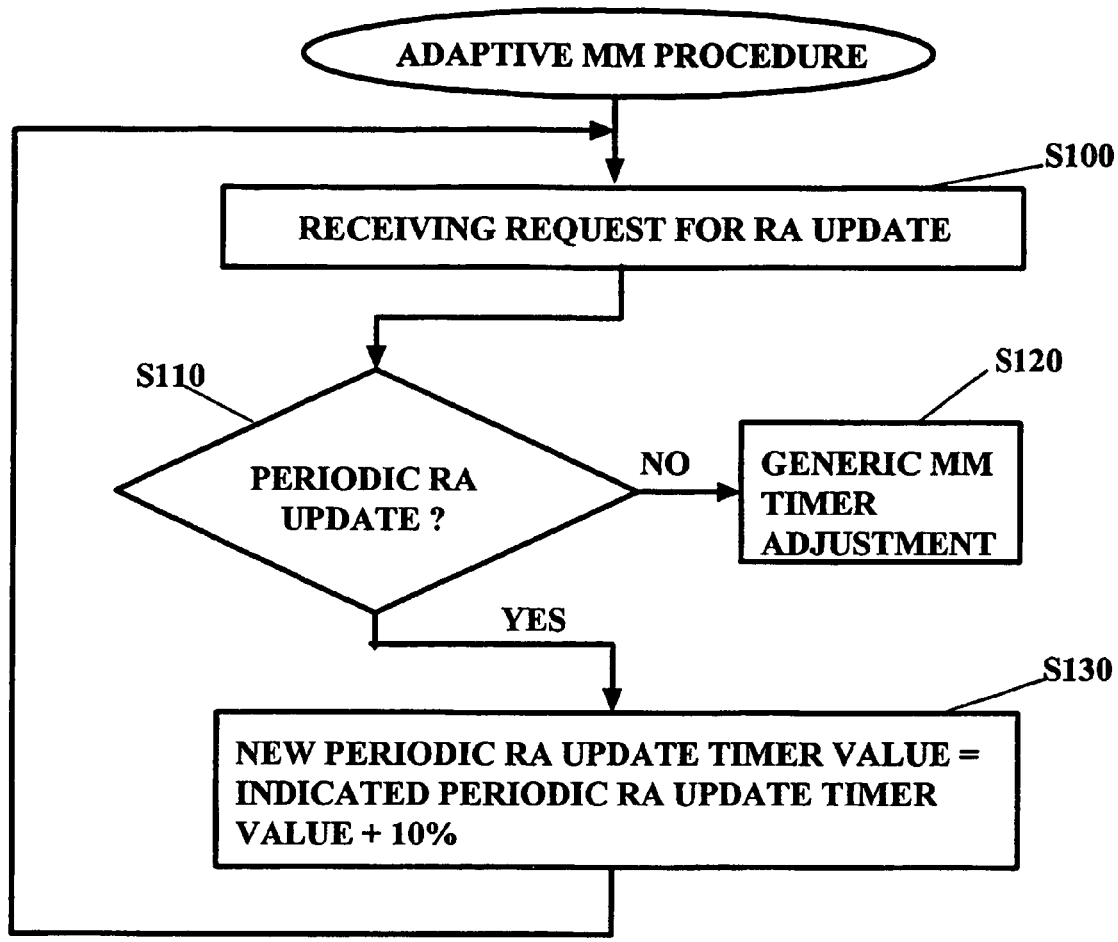
FIG. 6 is a flow chart illustrating an adaptive MM adjustment procedure.
Figure 7:
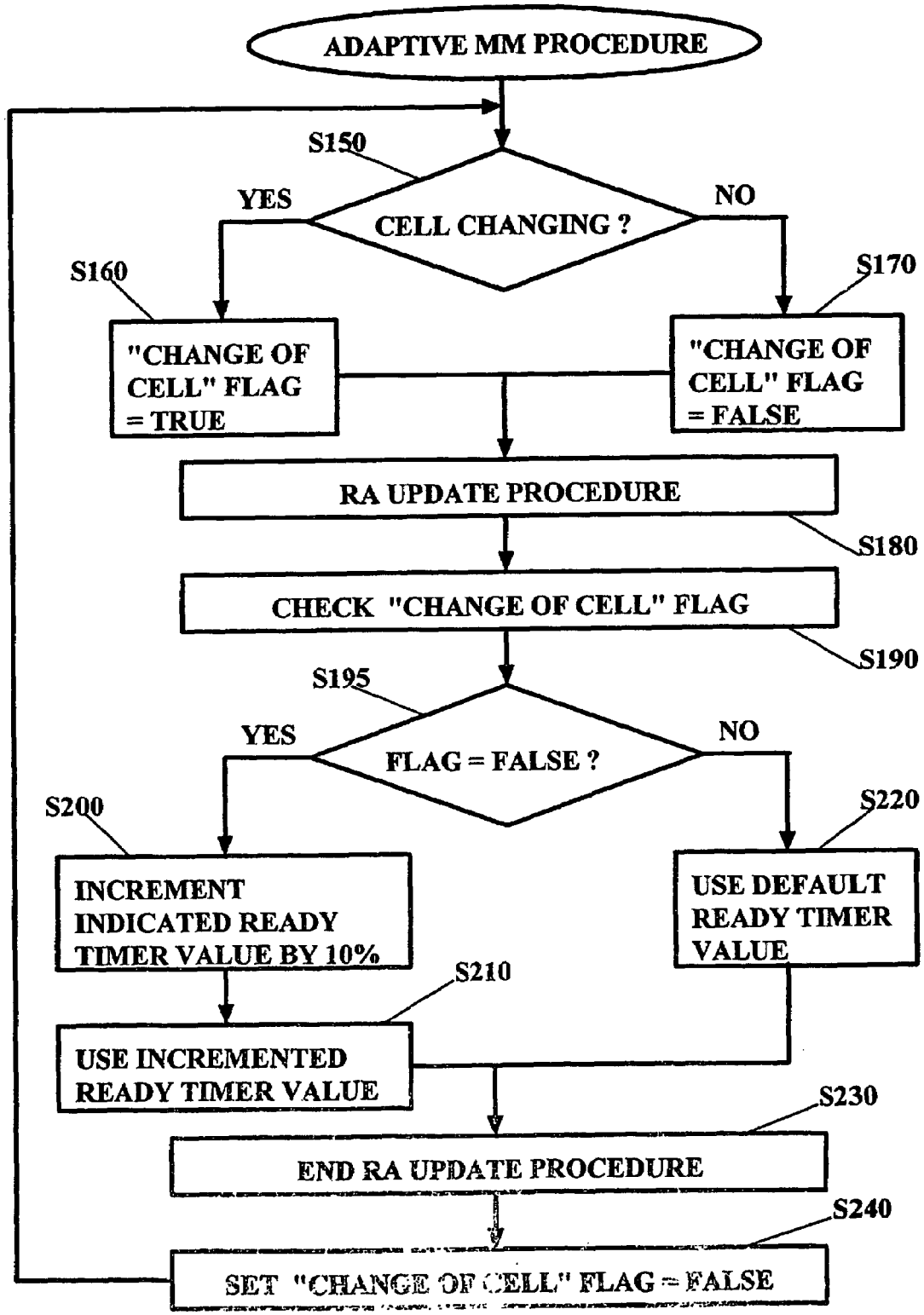
FIG. 7 is a flow chart illustrating an adaptive MM adjustment procedure.

A third embodiment is an "adaptive Mobility Management" which is described also with reference to FIGS. 6 and 7. According to this embodiment, a core network node with a mobility control unit adapted to execute such an "adaptive MM" is used in the mobile communication network. The concept of adaptive mobility management is that the core network (e.g. by means of the mobility control unit) monitors the degree of mobility of the MS without support of the MS (i.e. without an indication from the MS), and adapt its MM behavior (especially MM elements such as MM timers) based on the detected degree of mobility. This third preferred implementation is described in more details for a 2G SGSN used by GPRS system connected to a GSM radio network (such as shown in FIG. 3). The 2G SGSN comprises a default periodic RA update timer value which is indicated to the MS after an attach or a non-periodic RA update. This means, as shown in FIG. 6, when a RA update request is received by the SGSN, it is checked whether this is a periodic RA update (steps S100, S110). When the RA update is identified to be not a periodic RA update, generic MM timer settings (i.e. for example default periodic RA update timer value) is used for the MM adjustment (step S120). However when a periodic RA update is identified, step S130 is executed. This means, after a periodic RA update (indicating that the MS did not change RA during the time of the previous periodic RA update procedure), the new periodic RA Update timer is equal to the old one (as indicated in the periodic RA update request) increased by e.g. 10%. With this solution, a static MS (e.g. M2M device) will quickly (in a few days) reach its maximum periodic RA update timer value, minimizing the number of RA update load to the system.

Similarly, as for example shown in FIG. 7, in this "adaptive MM", the ready timer is negotiated during the RA update and attach procedure. It is proposed that the 2G SGSN implements a "change of cell" flag, which will be set to TRUE if the cell (i.e the location of the MS) is changing between RA update procedures. This requires the SGSN to always store the last known cell ID (even in Stand-by state) to be able to compare the new cell with the last known one. After a RA Update procedure is completed the flag is set to FALSE. The proposal is that before sending the RA Update accept, the SGSN checks the value of this flag. If this value is still false, it means that the MS has not changed cell since the previous RA Update, and then the new ready timer indicated to the MS is the old one increased by e.g. 10%. If the value is set to TRUE, the normal ready timer value (same than after first attach) is returned. In detail, as depicted in FIG. 7, in step S150 it is checked in the SGSN whether there is a cell change. If NO, step S170, the "change of cell" flag is set to false. If YES, step S160, the "change of cell" flag is set to true. When a RA update procedure (e.g. periodic RA update) is executed (step S180) the SGSN checks whether the "change of cell" flag is set to false (steps S190, S195). (It is clear that similarly also a check whether the flag is set to be true may be performed). When the flag is not false (i.e. true), the default ready timer value is used for the MM adjustment (step S220). If the flag is false, in step S200, the indicated ready timer value is incremented (e.g. by 10%), and the incremented ready timer value is used for the MM adjustment (step S210). When the RA update procedure is completed (step S230), the "change of cell" flag in the SGSN is reset to be false (step S240). Then, the process is repeated.

With this solution, a static MS (e.g. M2M device) will quickly (a few days) reach its maximum ready timer value, minimizing the number of paging and RA Update load (because periodic RA Update timer is started only after expiry of the ready timer) in the system.

It should be noted that according to the third embodiment, the timer values themselves (as normally indicated) are used as an indication of the MS mobility. It would be possible to also use a separate indicator as described above. When the ready timer reaches a high enough value (e.g. one hour), this may be considered as an indication that the MS is very static. Therefore 2G SGSN should disable the forced to stand-by mechanism based on this indication.

Figure 8:
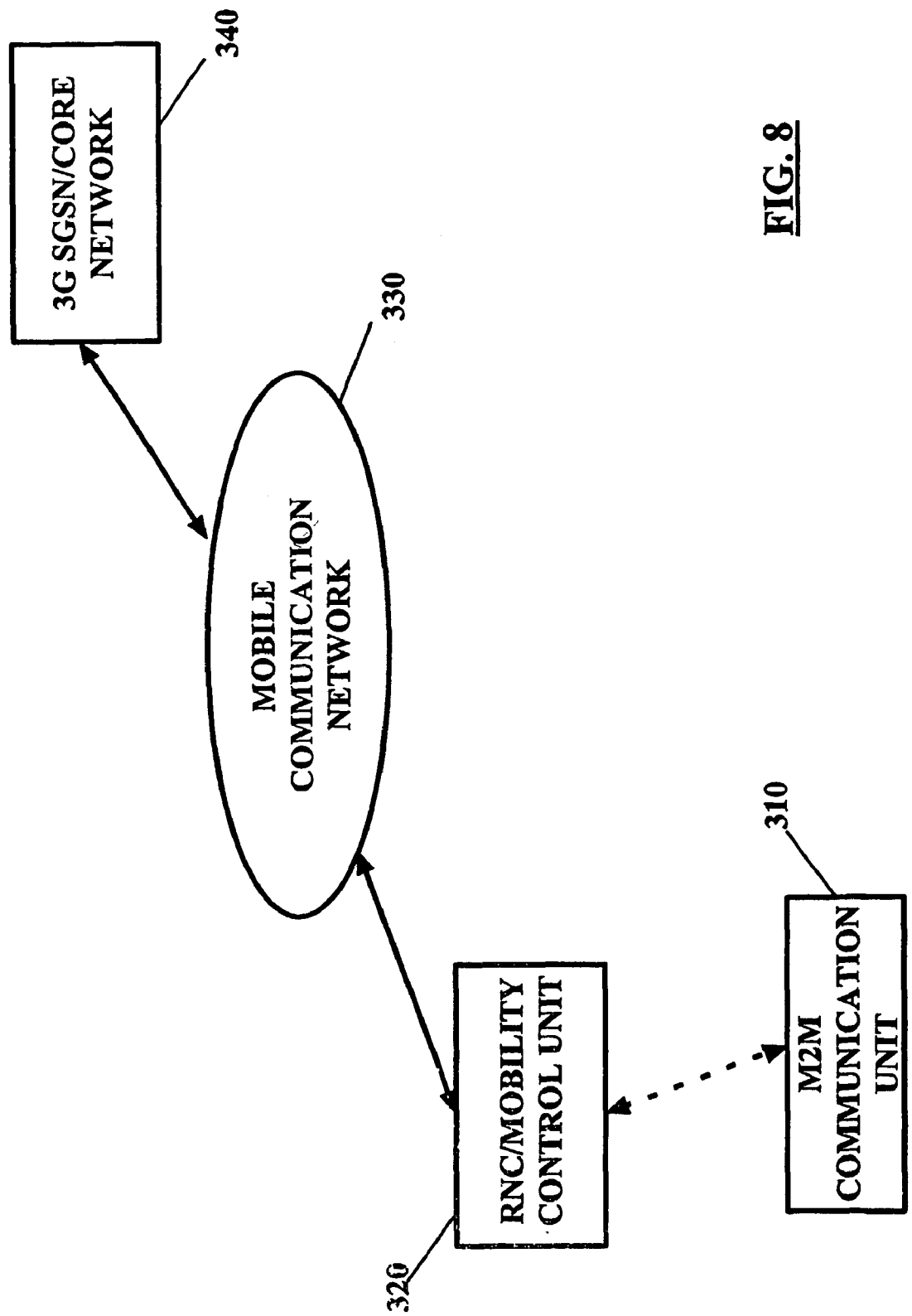
FIG. 8 shows a part of a mobile communication network for illustrating a MM adjustment procedure.

A fourth embodiment is shown, for example, in FIG. 8. According to the fourth embodiment, an implementation of the MM adjustment in a 3G mobile communication system 330 comprising, among others, a MS (M2M communication unit) 310, a RNC 320, in which a mobility control unit is integrated, and core network elements including a SGSN 340 is shown. The RNC 320 (with the mobility control unit) is adapted to modify the periodic (cell or URA) update timer value based on an indication of the degree of the mobility of a MS, i.e. of a M2M communication unit 310. This indication may be sent by the MS 310 in a RRC (radio resource control) message (similar to the mobility indication in the second embodiment), it may be derived from past history (similar to the adaptive solution of the third embodiment) or it may be indicated by the SGSN 340 through the insertion of a mobility indication parameter in RANAP (radio access network application part) messages (e.g. common identity procedure which is always performed for new Iu connection could be used). In case of, e.g., a Serving RNC relocation, a mobility indication parameter is sent to the Target RNC preferably inside the Source RNC To Target RNC Transparent Container.

According to the fourth embodiment, the value of the periodic update timer value is added into the cell update confirm and URA Update confirm RRC message as an optional mobility information element. A MS receiving this periodic update timer value uses this timer value instead of the one normally broadcast in common system information. Then RNC 320 sets a long timer for static MS. The RNC may also adapt the release of the RRC connection to the mobility of the MS.

As described above, there is disclosed a method of adjusting mobility management in a mobile communication network, said mobile communication network comprising a mobility control unit 4; 40; 320 adapted to track location of communication units 1; 10; 310 communicating in said mobile communication network and to control the mobility management for said communication units. Mobility information related to a communication unit is provided (S1) to said mobility control unit, which evaluates (S2) the degree of mobility of said communication unit from said mobility information related to said communication unit. On the basis of said evaluated degree of mobility, mobility management elements used for mobility management of said communication unit in said mobile communication network are correspondingly adjusted (S3). Furthermore, there are disclosed a corresponding mobility control unit, a corresponding communication unit as well as a corresponding mobility management adjustment system.

While preferred embodiments and modifications thereof have been described above, it is also possible to use combinations of the embodiments in a further application. Also, the embodiments and the measures disclosed therein are not limited to be used in connection with the respective described network environment (2G, 3G), but can be easily modified in such that they are compatible with other network structures as those described in the embodiments.

It should be understood that the above description and accompanying figures are merely intended to illustrate the present invention by way of example only. The preferred embodiments of the present invention may thus vary within the scope of the attached claims.

The invention claimed is:

1. A method, comprising:
   adjusting mobility management in a mobile communication network;
   tracking by a mobility control unit location of communication units communicating in said mobile communication network;
   controlling by the mobility control unit the mobility management for said communication units;
   providing said mobility control unit with mobility information related to a communication unit;
   evaluating the degree of mobility of said communication unit from said mobility information related to said communication unit; and,
   when said evaluating indicates the immobility of said communication unit, adjusting, by said mobility control unit, values of timer elements of said communication unit and said mobility control unit to a maximum timer value or a timer value being higher than a default timer value of said mobile communication network, said timer elements defining a time period of a ready state of said communication unit.

2. The method according to claim 1, further comprising: configuring said mobility information related to said communication unit to include a specific information element indicating a periodic update timer value and/or predefined mobility management parameter for mobility management elements of said communication unit and/or said mobility control unit, said periodic update timer value and/or predefined mobility management parameter being detected in said evaluating.

3. The method according to claim 1, further comprising: configuring said mobility information related to said communication unit to include previous location information and current location information of said communication unit, said previous location information and current location information being compared in said evaluating to determine whether they are equal.

4. The method according to claim 1, wherein said adjusting comprises setting said timer elements of said communication unit and/or said mobility control unit to predefined changed periodic update timer values and/or predefined changed mobility management parameters.

5. The method according to claim 1, further comprising: disabling a function of the mobile communication network which is used to force a modification of an operation state of the communication unit.

6. The method according to claim 1, further comprising: employing said communication unit in a static device used for at least one of a machine-to-machine application, a mobile-to-machine application, or a machine-to-mobile application.

7. The method according to claim 1, further comprising: including said mobility control unit in a core network control unit of the mobile communication network.

8. The method according to claim 1, further comprising: providing, by said communication unit, said mobility information related to said communication unit.

9. The method according to claim 8, wherein the providing said mobility information includes providing a request for setting at least one timer element to a maximum value.

10. The method according to claim 8, wherein the providing said mobility information includes providing a request for deactivating at least one timer element.

11. The method according to claim 1, further comprising: providing said mobility information related to said communication unit from a core network control unit of the mobile communication network.

12. The method according to claim 1, further comprising: setting the timer elements to maximum settable values in said adjusting of the timer elements.

13. The method according to claim 1, further comprising: deactiving the timer elements in said adjusting of the timer elements.

14. The method according to claim 1, further comprising: setting, in the adjusting of the timer elements, the timer elements to values which are incremented by a predetermined amount in comparison to the values set before.

15. An apparatus, configured to:
act as a mobility control unit in a mobile communication network;
track location of communication units communicating in said mobile communication network;
control the mobility management for said communication units;
receive mobility information related to a communication unit;
evaluate the degree of mobility of said communication unit from said mobility information related to said communication unit; and
adjust, when said evaluation indicates the immobility of said communication unit, values of timer elements of said communication unit and said mobility control unit to a maximum timer value or a timer value being higher than a default timer value of said mobile communication network, said timer elements defining a time period of a ready state of said communication unit.

16. The apparatus according to claim 15, wherein said received mobility information related to said communication unit includes a specific information element indicating a periodic update timer value and/or predefined mobility management parameter for mobility management elements of said communication unit and/or said mobility control unit, wherein said mobility control unit configured to evaluate the degree of mobility of said communication unit is configured to detect said periodic update timer value and/or predefined mobility management parameter.

17. The apparatus according to claim 15, wherein said received mobility information related to said communication unit includes previous location information and current location information of said communication unit, wherein said mobility control unit configured to evaluate the degree of mobility of said communication unit is configured to compares said previous location information and current location information to determine whether they are equal.

18. The apparatus according to claim 15, further configured to:
adjust said timer elements to set said timer elements of said communication unit and/or said mobility control unit to predefined changed periodic update timer values and/or predefined changed mobility management parameters.

19. The apparatus according to claim 15, further configured to:
disable a function of the mobile communication network which is used to force a modification of an operation state of the communication unit.

20. The apparatus according to claim 15, wherein said communication unit is configured to be employed in a static device used for at least one of a machine-to-machine application, a mobile-to-machine application, or a machine-to-mobile application.

21. The apparatus according to claim 15, wherein said mobility control unit is included in a core network control unit of the mobile communication network.

22. The apparatus according to claim 15, wherein said mobility information related to said communication unit is configured to be received from said communication unit.

23. The apparatus according to claim 22, wherein said mobility information includes a request for setting at least one timer element to a maximum value.

24. The apparatus according to claim 22, wherein said mobility information includes a request for deactivating at least one timer element.

25. The apparatus according to claim 15, wherein said mobility information related to said communication unit is configured to be provided from a core network control unit of the mobile communication network.

26. The apparatus according to claim 15, further configured to:
adjust the timer elements to set the timer elements to maximum setable values.

27. The apparatus according to claim 15, further configured to:
adjust the timer elements to deactivates the timer elements.

28. The apparatus according to claim 15, further configured to:
adjust the timer elements is configured to sets the timer elements to values which are incremented by a predetermined amount in comparison to the values set before.

29. An apparatus, configured to:
act as a communication unit configured to be used in connection with a mobile communication network, comprising a mobility control unit configured to track location of communication units communicating in said mobile communication network and to control the mobility management for said communication units;
send mobility information related to said communication unit, said mobility information being usable by said mobility control unit to evaluate the degree of mobility of said communication unit; and
set values of timer elements of said communication unit to a maximum timer value or a timer value being higher than a default timer value of said mobile communication network, said timer elements defining a time period of a ready state of said communication unit, on the basis of predefined changed periodic update timer values and/or predefined changed mobility management parameters received from said mobility control unit in response to the sending of said mobility information.

30. The apparatus according to claim 29, wherein said mobility information related to said communication unit includes a specific information element indicating a periodic update timer value and/or predefined mobility management parameter for mobility management elements of said communication unit and/or said mobility control unit.

31. The apparatus according to claim 29, wherein said communication unit is configured to be employed in a static device used for at least one of a machine-to-machine application, a mobile-to-machine application, or a machine-to-mobile application.

32. The apparatus according to claim 29, wherein said mobility information includes a request for setting at least one timer element to a maximum value.

33. The apparatus according to claim 29, wherein said mobility information includes a request for deactivating at least one timer element.

34. A mobility management adjustment system, comprising:
a communication unit; and
a mobility control unit, said mobility control unit being configured to
track location of communication units communicating in a mobile communication network,
control the mobility management for said communication units,
receive mobility information related to a communication unit,
evaluate the degree of mobility of said communication unit from said mobility information related to said communication unit, and
adjust, when said means adapted to evaluate indicates the immobility of said communication unit, values of timer elements of said communication unit and said mobility control unit to a maximum timer value or a timer value being higher than a default timer value of said mobile communication network, said timer elements defining a time period of a ready state of said communication unit.

35. The mobility management adjustment system according to claim 34, wherein said received mobility information related to said communication unit includes a specific information element indicating a periodic update timer value and/or predefined mobility management parameter for mobility management elements of said communication unit and/or said mobility control unit, wherein said mobility control unit configured to evaluate the degree of mobility of said communication unit is configured to detect said periodic update timer value and/or predefined mobility management parameter.

36. The mobility management adjustment system according to claim 34, wherein said received mobility information related to said communication unit includes previous location information and current location information of said communication unit, wherein said mobility control unit configured to evaluate the degree of mobility of said communication unit is configured to compare said previous location information and current location information to determine whether they are equal.

37. The mobility management adjustment system according to claim 34, wherein said mobility control unit configured to adjust said timer elements sets said timer elements of said communication unit and/or said mobility control unit to predefined changed periodic update timer values and/or predefined changed mobility management parameters.

38. The mobility management adjustment system according to claim 34, wherein said mobility control unit is further configured to disable a function of the mobile communication network which is used to force a modification of an operation state of the communication unit.

39. The mobility management adjustment system according to claim 34, wherein said communication unit is employed in a static device used for at least one of a machine-to-machine application, a mobile-to-machine application, or a machine-to-mobile application.

40. The mobility management adjustment system according to claim 34, wherein said mobility control unit is included in a core network control unit of the mobile communication network.

41. The mobility management adjustment system according to claim 34, wherein said mobility information related to said communication unit is received from said communication unit.

42. The mobility management adjustment system according to claim 41, wherein said mobility information includes a request for setting at least one timer element to a maximum value.

43. The mobility management adjustment system according to claim 41, wherein said mobility information includes a request for deactivating at least one timer element.

44. The mobility management adjustment system according to claim 34, wherein said mobility information related to said communication unit is provided from a core network control unit of the mobile communication network.

45. The mobility management adjustment system according to claim 34, wherein said mobility control unit is configured to adjust the timer elements to set the timer elements to maximum setable values.

46. The mobility management adjustment system according to claim 34, wherein said mobility control unit is configured to adjust the timer elements to deactivates the timer elements.

47. The mobility control unit according to claim 34, wherein said mobility control unit is configured to adjust the timer elements to set the timer elements to values which are incremented by a predetermined amount in comparison to the values set before.

48. The mobility management adjustment system according to claim 34, wherein said communication unit is configured
to send mobility information related to said communication unit, said mobility information being usable by said mobility control unit to evaluate the degree of mobility of said communication unit, and
to set values of timer elements of said communication unit to a maximum timer value or a timer value being higher than a default timer value of said mobile communication network, said timer elements defining a time period of a ready state of said communication unit on the basis of predefined changed periodic update timer values and/or predefined changed mobility management parameters received from said mobility control unit in response to the sending of said mobility information.

49. The mobility management adjustment system according to claim 48, wherein said mobility information related to said communication unit includes a specific information element indicating a periodic update timer value and/or predefined mobility management parameter for mobility management elements of said communication unit and/or said mobility control unit.

50. The mobility management adjustment system according to claim 48, said communication unit is employed in a static device used for at least one of a machine-to-machine application, a mobile-to-machine application, or a machine-to-mobile application.

51. The mobility management adjustment system according to claim 48, wherein said mobility information includes a request for setting at least one timer element to a maximum value.

52. The mobility management adjustment system according to claim 48, wherein said mobility information includes a request for deactivating at least one timer element.

53. An apparatus, comprising:
a mobility control unit in a mobile communication network, said mobility control unit being configured to track location of communication units communicating in said mobile communication network and to control the mobility management for said communication units,
said mobility control unit comprising
means adapted to receive mobility information related to a communication unit,
means adapted to evaluate the degree of mobility of said communication unit from said mobility information related to said communication unit, and
means adapted to adjust, when said means adapted to evaluate indicates the immobility of said communication unit, values of timer elements of said communication unit and said mobility control unit to a maximum timer value or a timer value being higher than a default timer value of said mobile communication network, said timer elements defining a time period of a ready state of said communication unit.

* * * * *